FROM BLOW-MOLDING PRESS

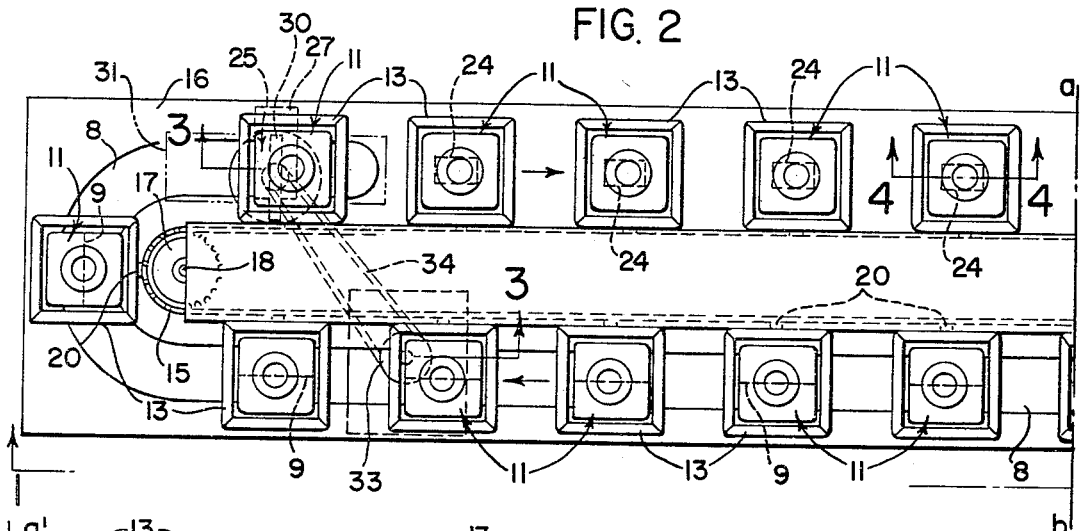
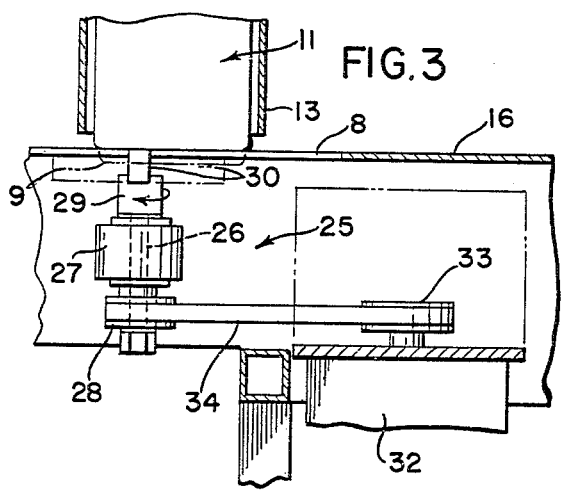

INVENTORS.
CHARLES J. WAECHTER &
LLOYD KOVACS
BY

*Thomas S. Mayner*
ATTORNEY

United States Patent Office 3,486,190
Patented Dec. 30, 1969

3,486,190
APPARATUS FOR CONTINUOUSLY REMOVING
FLASH FROM BLOWN ARTICLES
Charles J. Waechter, 123 N. Nelson Ave., Piscataway, N.J. 08854, and Lloyd Kovacs, 27 Beverly Ave., Somerset, N.J. 08873
Filed Feb. 1, 1967, Ser. No. 613,238
Int. Cl. B29c *1/00;* B65h *35/18;* B26f *3/00*
U.S. Cl. 18—5                           5 Claims

ABSTRACT OF THE DISCLOSURE

Multiple blown bottles or jugs having flash are carried in holding buckets over a flash remover. The continuously operating flash remover tears off the excess and deposits it on a running belt carrying it on to waste storage, meanwhile the buckets are emptied and returned to a position under the mold.

---

This invention relates to flash trimming apparatus of excess material known as "flash" or "tabs" from plastic molded products associated with a continuously operating extruder and its associated blow molding means.

In the manufacture of hollow products such as jugs or bottles by blow molding of plastic parisons in a split mold, there is generally always formed a tab of excess material attached to the base. This is unavoidable inasmuch as the parison must be long enough to have its base end firmly clamped closed by the mold halves prior to blowing. The mold designs provide for the escape of the excess plastic which upon cooling becomes "flash" or "tab." Obviously, this tab must be removed in order to have a finished product. Manual removal, such as a quick tear, is not good procedure so various mechanical ways have been devised to perform this task automatically. Most are attached directly to the mold and thus to the extruder. This invention advantageously provides for an apparatus adapted to be aligned with a multiple mold and its extruder that automatically will accept and hold a plurality of blown articles having tabs, and quickly pass them on for removal while others are being formed and those preceding are passed on to another conveyer or to storage.

The aforementioned tab removing apapratus is shown in the accompanying drawings and it will now be described in detail; in the drawings:

FIGURES 2 and 2A are split plan views of the bottle receiving, holding and conveying means over the detabber;

FIGURE 3 is a sectional detail of the detabber device;

Figure 1:
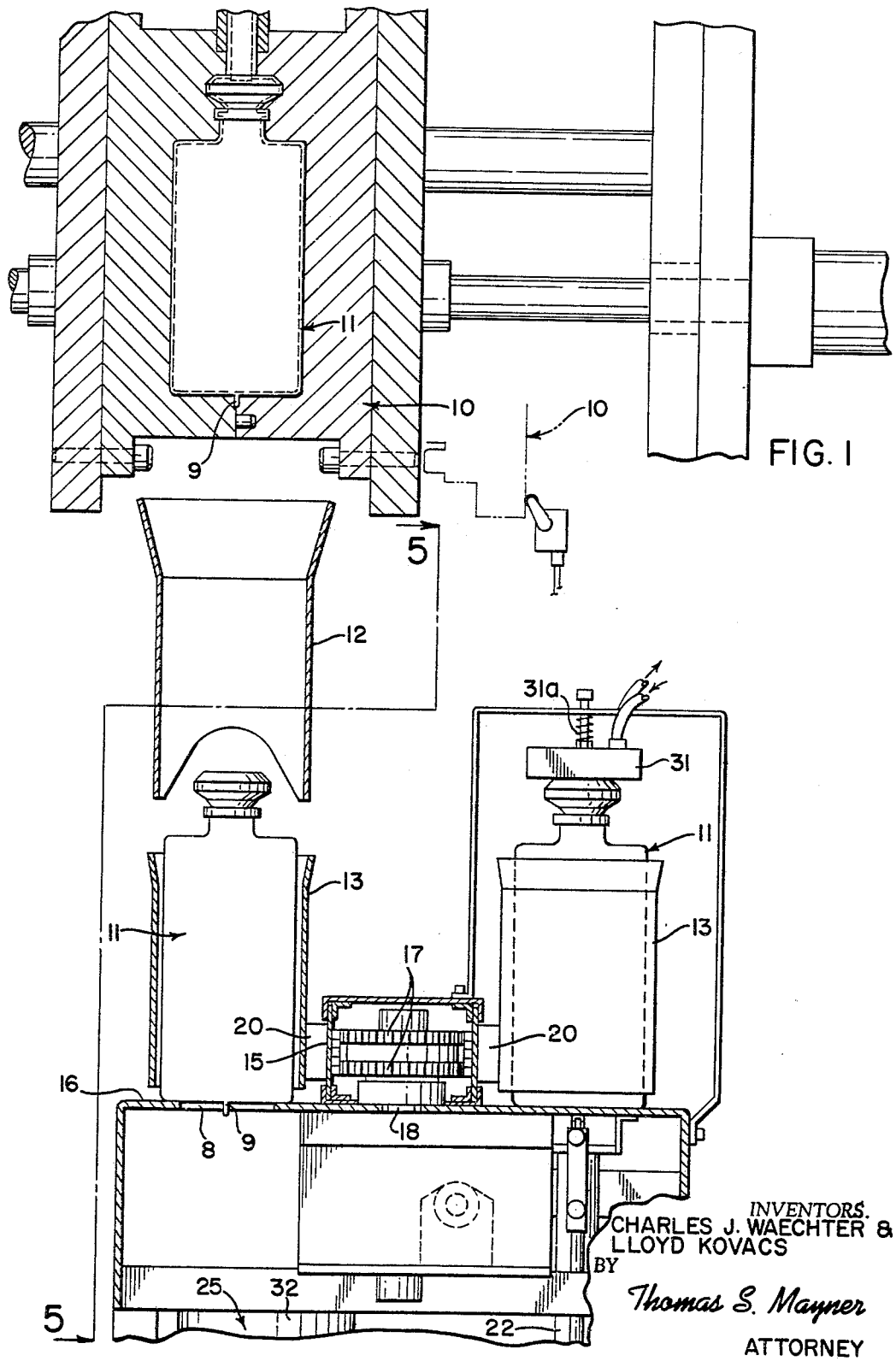
FIGURE 1 represents in partial section a detabbing or flash removing apparatus receiving and holding bottles or jugs from a mold positioned above it for conveyance over a tab remover and to a forwarding station.
Figure 5:
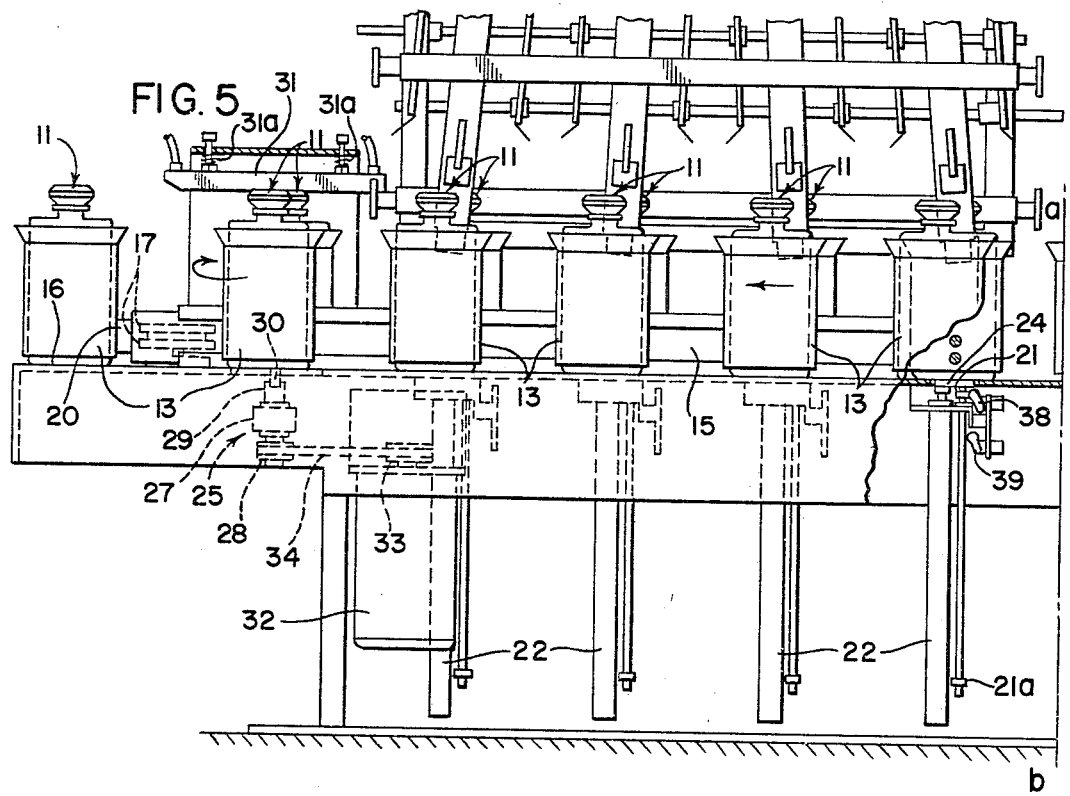
Figure 5A:
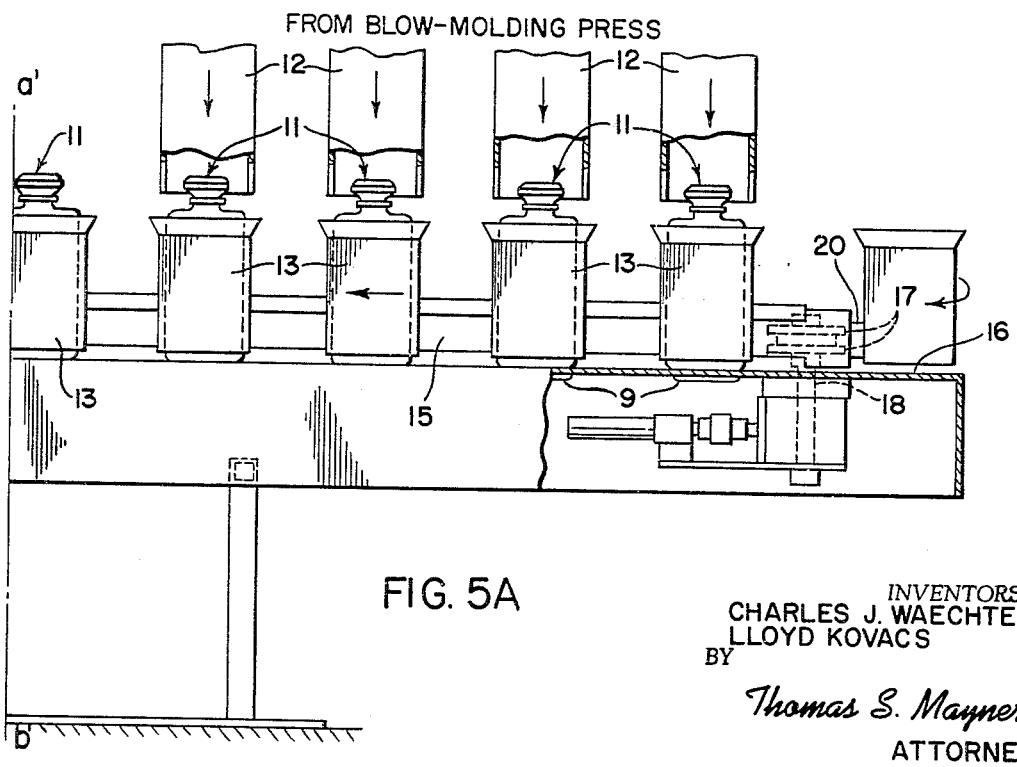

FIGURE 4 is a view in partial section of the bottle or jug removing means from out of the conveyer taken on lines 4—4 of FIGURE 2; and FIGURES 5 and 5A are elevations taken or lines 5—5 of FIGURES 1 and 2.

In reference to the drawing and to FIGURE 1 thereof the end sectional view of the mold 10 shows one of a plurality of blown jugs 11 with tabs 9 already blown and ready for release. The jug 11 and its companions are dropped through an aligning chute 12 (also see FIGURE 5A) into consecutively related buckets 13 attached to an endless belt 15 mounted atop a supporting platform 16. The belt rotates about end cog wheels 17 (also see FIGURE 2) mounted on shafts 18. The power means driving the shafts 18 is not shown since attachment of the shaft to a motor can be had in various ways. It also is correlated with the mold 10 discharge period. The receiving buckets 13 are secured to the belt 15 by intervening members 20. Since the described elements are of metal any method of securing the one part to another can be utilized such as welding, bolting, etc.

The platform 16 has a surface slot or opening 8 to admit the tab of each jug 11 while the jug itself rests on the surface of the table 16. Once all of the jugs 11 are expelled from the mold 10, and this is simultaneously done, they are positioned in respective holding buckets 13. The endless belt 15 carries them, silding over the table, and over a detabbing device 25 positioned in the table 16 in their path and imediately under the table top as shown in FIGURE 3. The removal of the flash 9 is automatic. It is done by the weighted remover 30 without any stopping of the carrier belt 15 as it continues to move on around the end supporting wheel 17 to a jug discharge position on the other side. While the bottles are being removed on the opposite side from their holding buckets a new charge of jugs is taking place.

The discharge of the bottle is effected by a pneumatic lift 22 (shown in greater detail in FIGURES 4 and 5) into guideways leading to storage or a filling station and which will be hereinafter more thoroughly described. As a series of loaded buckets 13 leave their station from under a multiple mold 10 those, such as the group of four seen in FIGURES 2 and 5, move in a clockwise direction over the flash or tab removing device 25. The tab removing device 25 itself comprises a shaft 26 mounted in a bearing sleeve 27 that is secured in any desirable manner to the support of the platform 16. On one end of the shaft 26 there is positioned a sheave or pulley 28 while on the other a holding means 29 for a rectangular tab removing blade 30. Spaced from the sheave 28 is an electric motor 32 also having a sheave 33 on its shaft. An endless belt 34 is positioned in the sheaves 28 and 33 to therethrough rotate the tab removing blade 30. The rapid rotation of the weighted tab remover 30 knocks off the tabs as readily as the buckets 13 move their jugs there cover. Somewhat of assistance is the fact that the tabs are still soft. The jug tops are also soft and readily deformable and since the jugs must be held down during detabbing operations, the jug top is simultaneously held down and chilled by means of the spring suspended plate 31 through which a cooling medium circulates. Another reason for neck cooling at this time is where the jugs are to be conveyed by pushing each other forward. A soft neck would be plasticized to the base of the preceding one. The spring suspension 31*a* assists in maintaining a desired pressure in the jug for the detabbing and for the intimate contact of the cooling surface. As the buckets 13 move away from the detabbing area they are subsequently positioned for simultaneous removal by a consecutive plurality of pneumatically actuated lifts 22, shown in FIGURES 2, 4, 5. The lifts 22 desirably are actuated simultaneously in this instance by means of a sensing device 35 (FIGURE 4) attached to every fourth bucket 13 which depresses a triggering valve 36, opening a source of air to the lifters 22.

The lift 22 as seen in FIGURES 4 and 5 comprises an air cylinder having a piston on whose rod 23 extension is an enlarged pad 24 which engages the bottom of the bottle or jug. Moving with the piston rod 23 is a side rod 26 carrying spaced cams 21 and 21*a* adapted to contact adjacently positioned travel limiting valves 38, 39 effecting movement in upward and downward directions. The lift of the kind being described is a readily available unit on the market and advantageously is applicable to the described operation.

The loading of the buckets 13 and all subsequent movements of the endless belt 15 from charge to discharge is indexed through the directing chute 12, buckets 13 from the production of the mold into respective guideways in the interest of automatic continuity. More or less jugs may be molded in one operation and the tab removing table unit need hardly be altered to continue to readily accommodate any such change. The flash removing apparatus is adapted to be included in continuous manufacture of finished jugs or bottles. It can accommodate separate molding extruders or those of plural blow molds. Its indexing feature permits tracing of a product throughout its travel from mold to a use or storage station. It incorporates means accepting, holding, conveying, a plurality of jugs for the detabbing operation, without stopping therefor, then continuing on to a removal station, for another operation.

What is claimed is:

1. The combination of a supply of a plurality of blown articles having attached bottom flash to be subsequently removed, a plurality of consecutive buckets positioned directly below said supply in a gravity receiving position of said blown articles, a traveling support for said buckets, said buckets carrying said articles over a path in which a detabber is positioned, a detabber in continuous operation for removing base flash from blown articles passing thereover, and means in association with said supply and actuated thereby for discharging said detabbed articles out of said buckets and simultaneously refilling said buckets.

2. The combination of a mold periodically discharging a plurality of blown articles having attached flash to be removed comprising, a receiving plurality of buckets positioned directly below said mold, said articles being droppd into said buckets, a traveling support for said buckets, flash removal means in the path of said traveling support, said support carrying said filled buckets over said flash removal means, said bucket support means continuing on to an article discharge area, means for effecting a temporary stopping of said bucket carrying means, article discharge means, and said latter means discharging said buckets during said stop and prior to their return position under said mold.

3. The combination of a mold periodically discharging a plurality of blown articles having attached flash to be removed comprising, simultaneously with discharge of said mold placing in position below it a receiving plurality of buckets, intervening guide means for directing said dropping articles into said buckets, an adjacent flash removal means, means carrying said filled buckets over said flash removal means, said bucket carrying means continuing on to an article discharge area, means responsive to the operation of said mold effecting a temporary stopping of said bucket carrying means, and means positioned relative the mold and being actuated by said mold operating means discharging said buckets during said stop on their return to a position under said mold.

4. The combination of a mold periodically discharging a plurality of blown articles having attached flash to be removed comprising, simultaneously with discharge of said mold placing in position below it a receiving plurality of buckets, an intervening guide means for directing said dropping articles into said buckets, an adjacent flash removal means, means to which said buckets are attached carrying said filled buckets over said flash removal means, means for depressing the blown articles positioned above said flash removal means, said bucket carrying means continuing on to an article discharge area, means responsive to an open mold effecting a temporary stopping of said bucket carrying means, and means discharging said buckets of said articles during said stop meanwhile simultaneously said buckets under said mold are reloaded.

5. The combination of a mold periodically discharging a plurality of blown articles having attached bottom flash to be removed comprising, a plurality of receiving buckets for said blown articles, simultaneously with discharge of said mold placing in position said receiving plurality of buckets, said blown articles dropping into said buckets upon opening of said mold, an endless belt supporting said buckets and moving them in a predetermined path, an intervening guide means for directing said dropped articles from said mold into said buckets, a bottom flash removal means positioned in the path of said buckets and over which the articles pass, means positioned above said path and about over the flash removing means for vertically depressing said blown articles during flash removal, said depressing means having also a cooling medium circulating through it to cool and rigidize the top flash of said blown articles, said bucket belt means continuing on to a discharge stop, an article discharge stop, means responsive to an open mold effecting a temporary stopping of said bucket carrying means, and means for simultaneously discharging said blown articles out of said buckets during said stop meanwhile simultaneously reloading said buckets from said mold.

References Cited

UNITED STATES PATENTS

| 3,058,150 | 10/1962 | Makowski. |
| 3,218,669 | 11/1965 | Barker. |
| 3,319,498 | 5/1967 | Wolford. |
| 3,351,981 | 11/1967 | Rupert _____ 83—914 |
| 3,382,531 | 5/1968 | Hagen. |

WILBUR L. McBAY, Primary Examiner

U.S. Cl. X.R.

264—161; 225—97, 103